(12) United States Patent
Schuder et al.

(10) Patent No.: US 9,641,807 B2
(45) Date of Patent: May 2, 2017

(54) MOTOR VEHICLE WITH A DRIVER ASSISTANCE SYSTEM AND METHOD OF OPERATING A DRIVER ASSISTANCE SYSTEM

(71) Applicant: Audi AG, Ingolstadt (DE)

(72) Inventors: Claudia Schuder, Ingolstadt (DE); Erich Bruns, Weimar (DE)

(73) Assignee: AUDI AG, Ingolstadt (DE)

( * ) Notice: Subject to any disclaimer, the term of this patent is extended or adjusted under 35 U.S.C. 154(b) by 650 days.

(21) Appl. No.: 13/963,573

(22) Filed: Aug. 9, 2013

(65) Prior Publication Data

US 2014/0043483 A1 Feb. 13, 2014

(30) Foreign Application Priority Data

Aug. 10, 2012 (DE) .......... 10 2012 015 939

(51) Int. Cl.
*H04N 7/18* (2006.01)
*G06K 9/00* (2006.01)
*B60W 30/06* (2006.01)

(52) U.S. Cl.
CPC ........... *H04N 7/18* (2013.01); *G06K 9/00805* (2013.01); *B60W 30/06* (2013.01); *B60W 2420/403* (2013.01)

(58) Field of Classification Search
None
See application file for complete search history.

(56) References Cited

U.S. PATENT DOCUMENTS

| | | | |
|---|---|---|---|
| 2004/0222947 A1* | 11/2004 | Newton | F21L 14/023 345/39 |
| 2008/0007429 A1 | 1/2008 | Kawasaki et al. | |
| 2009/0027522 A1* | 1/2009 | May | G06T 7/0085 348/252 |
| 2009/0040500 A1* | 2/2009 | Nishiushi | G01S 7/48 356/3.11 |
| 2009/0072996 A1 | 3/2009 | Schoepp | |

(Continued)

FOREIGN PATENT DOCUMENTS

| | | |
|---|---|---|
| CN | 10271067 A | 8/2011 |
| DE | 197 37 653 A1 | 3/1999 |

(Continued)

OTHER PUBLICATIONS

H. Winner et al: "3D Time-of-Flight", Handbuch Fahrerassistenzsysteme (Handbook Driver Assistance Systems), 2nd, revised version, Vieweg + Teubner, 2012, p. 187-197, ISBN 978-3-8348-8619-4.

(Continued)

*Primary Examiner* — Dakshesh Parikh
(74) *Attorney, Agent, or Firm* — Henry M. Feiereisen LLC.

(57) ABSTRACT

A motor vehicle includes a control device and at least one lighting device which is controllable by the control device sequentially in at least two modes which illuminate surroundings of the vehicle differently. At least one camera captures at least two images of the differently illuminated surroundings of the vehicle. The at least two different images are processed by an image processing device for producing a processing result which is transmitted for control of a driver assistance system.

10 Claims, 3 Drawing Sheets

(56) References Cited

U.S. PATENT DOCUMENTS

| 2010/0060487 A1* | 3/2010 | Augst | G06K 9/2036 340/937 |
|---|---|---|---|
| 2010/0328644 A1* | 12/2010 | Lu | G01S 7/4802 356/5.01 |
| 2011/0010094 A1 | 1/2011 | Simon | |

FOREIGN PATENT DOCUMENTS

| DE | 103 54 714 B4 | 6/2005 |
| DE | 10 2007 050 374 A1 | 4/2009 |
| DE | 10 2008 011 228 A1 | 8/2009 |
| DE | 10 2008 025 947 A1 | 12/2009 |
| DE | 10 2011 089 629 A1 | 6/2012 |
| EP | 2 026 097 A1 | 2/2009 |
| EP | 2 028 632 A2 | 2/2009 |

OTHER PUBLICATIONS

Chinese Search Report issued in counterpart Chinese patent application No. 2013103542650X on Jun. 3, 2015.
English translation of Chinese Search Report issued in counterpart Chinese patent application No. 2013103542650X on Jun. 3, 2015.

* cited by examiner

MOTOR VEHICLE WITH A DRIVER ASSISTANCE SYSTEM AND METHOD OF OPERATING A DRIVER ASSISTANCE SYSTEM

CROSS-REFERENCES TO RELATED APPLICATIONS

This application claims the priority of German Patent Application, Serial No. 10 2012 015 939.0, filed Aug. 10, 2012, pursuant to 35 U.S.C. 119(a)-(d), the content of which is incorporated herein by reference in its entirety as if fully set forth herein.

BACKGROUND OF THE INVENTION

The present invention relates to a motor vehicle with a driver assistance system and a method of operating a driver assistance system.

The following discussion of related art is provided to assist the reader in understanding the advantages of the invention, and is not to be construed as an admission that this related art is prior art to this invention.

The automobile industry increasingly equips motor vehicle with a driver assistance system to assist the driver when exciting standard tasks, like parking or maintaining speed. In addition, systems are more and more in demand to enable autonomous driving. Driver assistance systems receive information from numerous detectors and cameras mounted to the vehicle. Images captured by the cameras are normally processed by an image processing device which generates processing results that are made available to the driver assistance system. A majority of image-processing algorithms is based on edge detection. Algorithms for edge detection are based on the recognition of sudden changes in color or brightness. Therefore, images need to be evenly illuminated when transmitted to an edge detection algorithm.

When employing such driver assistance systems in poor light conditions, the image area of the camera can be illuminated by lighting devices mounted on the vehicle. Since illumination from a vehicle is highly directed, the image may be distorted by shadows or intense contrasts. For example, sensitivity of the camera has to be reduced in the presence of reflecting or bright or close objects to avoid saturation. This, in turn, causes loss of sensitivity in darken image areas. Moreover, illumination of the vehicle surroundings, using a lighting device on the vehicle, may result in shadows which can be misinterpreted by the image processing device as edge.

It would therefore be desirable and advantageous to address this problem and to obviate other prior art shortcomings.

SUMMARY OF THE INVENTION

According to one aspect of the present invention, a motor vehicle includes a control device, at least one lighting device controllable by the control device sequentially in at least two modes which illuminate surroundings of vehicle differently, at least one camera for capturing at least two images of the differently illuminated surroundings of the vehicle, an image processing device configured for processing the at least two different images for producing a processing result, and a driver assistance system controlled in response to the processing result.

The present invention resolves prior art problems by implementing image processing on the basis of several images with different illumination of the vehicle surroundings. In this way, it is possible for example to illuminate only parts of the image area of the camera or to illuminate an object from different angles. The captured images include for each pixel a brightness information. As the images are captured when the vehicle surroundings are differently illuminated, the images store different brightness values for at least portions of the pixels. The brightness values of the pixels depend on the intensity of illumination of an image area, which in turn depends on the direction from which an image area is illuminated. As the image processing device is provided with several images that have been captured through different illumination of the vehicle surroundings, it can be recognized for example whether a sudden brightness transition in an image is the cause of an actual edge or a shadow as the same spot is captured by a second image that may not have this shadow for example because the lighting device responsible for the shadow is not activated. Thus, solely on the basis of processing brightness information of several differently illuminated images does it become possible to gain further information about the surroundings of the motor vehicle.

For example, the afore-mentioned problem of saturation of an image in the presence of very bright or reflecting objects in the image can be overcome by simply illuminating only parts of the vehicle surroundings and thus of the image. For example, an image may be initially captured with normal lighting and subsequently an image is captured in which the brightness of illumination is reduced in the area of very bright or reflecting objects. In this case, there are several possibilities for further processing. Both images can be combined on a non-linear scale to enable further contrast ranges, on one hand, and an independent edge detection in both images and a subsequent combination of the information can be executed, on the other hand. An independent edge detection requires however that new edges may be artificially generated, when an image area is not illuminated or dimly lit. As these edges occur however at a known location and with known shape, the presence of such edges can be easily disregarded by the method.

Capturing several images in different illumination modes also enables a differentiation between shadows and real edges during edge detection. This can be explained using the simple case of a motor vehicle having two light sources to the left and right on the front side of the vehicle. When directly illuminated by a light cone, an object casts a shadow, i.e. there are regions behind the object with no light. When an object is illuminated by two parallel light cones at a certain distance, two slightly darkened zones are generated behind the object because these zones are illuminated by only one respective light cone. This darkening can easily be recognized as artificial edge during image processing. According to the invention, further images are however captured, with each image being captured by only one of the light sources of the vehicle being active. Using an active light source enables full illumination of one of the two zones previously slightly darkened, whereas the other one is not illuminated. The edges produced as a result of shadows in the first image partly disappear and partly are more pronounced in both images which are captured by only one light source. Edges that are more pronounced in an image disappear in the other image, and vice versa. As a result, it is now easily possible to recognize edges which are generated by shadows.

When there is no total darkness, there is the possibility to recognize artificial edges caused by shadows through capturing of some images with reduced brightness of the lighting device. When the contrast of an edge decreases significantly faster than other contrasts in the image, as a result of reducing the brightness of the lighting device, it can be assumed that the apparent edge has been generated by a shadow.

The image processing device is thus able in response to a processing result which is dependent on an edge detection to recognize through comparison of images of differently illuminated vehicle surroundings whether an edge detected at least in one of the images involves an actual edge or an edge caused by a shadow.

According to another advantageous feature of the present invention, the lighting device can include at least one light source capable of being modulated. Modulation of the light sources may be implemented in various ways. For example, it is possible to change the beam angle of the light source or to change the brightness of the light source. As can be seen with reference to the afore-described example of a motor vehicle with two light sources, it may suffice to simply shut down a single light source. Shadows may be recognized and thus false interpretation of edges can be avoided already in the presence of a certain residual brightness or a further non-modulated light source.

According to another advantageous feature of the present invention, the brightness of the light source can be continuously changed. Advantageously, the lighting device can include a plurality of light sources, with the control device being configured for switching or modulation of the light sources individually or in groups. Thus, a configuration of light sources in groups for example allows detection of various angles of illumination of an object. As described above, the use of two light sources at relatively great distance is oftentimes sufficient to clearly distinguish between actual edges and edges caused by shadows. The presence of a greater number of light sources is however beneficial to enable a nearly continuous variation of the angle of illumination.

For example, it is possible to configure the two front headlights of a motor vehicle with a plurality of light-emitting diodes which illuminate a certain solid angle. This nearly continuous variation of the angle of illumination is advantageous especially because edges caused by shadows "migrate". A change of the angle of illumination results in the captured image in a rotation of the edge. When capturing the images successively at sufficiently short distances, such an edge rotation is normally not to be expected, when actual edges are involved. Thus, edges, caused by shadows can easily be recognized.

According to another advantageous feature of the present invention, the lighting device can include at least one micro-mirror actuator. An array of micro-mirrors is hereby illuminated with a light source. Each micro-mirror has normally two positions. In one of the positions, light is deflected onto an absorber. In the other one of the positions, light is radiated by an optics. When such a system is used instead of a normal headlight in a motor vehicle, parts of the bundle of rays emitted by the headlight can be darkened. In this way, illumination by the headlight can be adapted with very fine resolution.

The presence in a motor vehicle of a plurality of light sources that can be modulated enables a wide variety of applications in addition to an improvement of contrast and/or edge detection. According to another advantageous feature of the present invention, the processing result can be a distance interval for an object at at least one pixel, with the control device having at least one further modus to differently illuminate the surroundings of the vehicle for operating the lighting device, with the image processing device configured to process at least one further different image, when the distance interval has a width which exceeds a desired value.

Modulation of light sources enables illumination of various solid angles of the vehicle surroundings. In the presence of a lighting device which for example is located distal to a camera and comprised of a plurality of light sources which illuminate different solid angles, the solid angle between light source and object can be determined at a pixel by modulating various groups of light sources. A pixel appears the most brightest in those images in which all light sources which illuminate the object at this pixel have maximum intensity. The solid angle between light source and pixel can thus be determined for example by increasingly darken or deactivating more light sources. A second solid angle is established by image coordinates because each image coordinate corresponds to a solid angle with respect to the camera.

As the beam angles of the individual light sources are known, distance determination requires only determination of which of the light sources illuminate the object at the pixel. This is especially possible by capturing an image at full illumination and subsequently shutting down half of the light sources which intensely emit light to the side, i.e. illuminate close objects, and then capturing a further image. In the event the pixel to be examined in both images is of same brightness, a minimum distance is established. In the event the pixel is markedly darker in the second image, a maximum distance can be established. In a next shot, this interval can be further subdivided. The change of the illumination and image shot is continued as long as the width of the distance interval is below a desired value or until another cut-off condition is reached.

To realize a better distance resolution, the data about the distance can be interpolated. For simplicity reasons, it shall be assumed that switching of two light sources greatly influences the brightness of the pixel. In this case, the image processing device is able to determine, on the basis of the strength of the influence of switching of the respective light source upon the brightness of the pixel, as to whether the pixel can be associated to one or the other solid angle. To provide a more stable method, it is advantageous to space the light sources at great distance. For example, two headlights may be provided which are composed of a plurality of light sources.

According to another advantageous feature of the present invention, the driver assistance system can be configured for autonomous execution of individual driving maneuvers, e.g. entering a garage or parking. Assuming for example a possible scenario in which autonomous driving through a gate is desired, whereby the vehicle stands at an unspecified distance to the gate. In this case, the situation is captured by the camera in the vehicle. To enable autonomous driving, it is required to recognize the inner boundaries of the gate, using the camera. When the ambient lighting is low, the headlights are activated to illuminate the environment. This may produce shadows so that image processing algorithms, such as e.g. edge detection, may incorrectly interpret the situation. According to the present invention, shadows can be recognized through change of the illumination and capturing several images. In this way, it is possible to recognize actual edges to enable an autonomous passage of the gate. In addition, distances of individual spots can be ascertained in accordance with the invention to supplement the pure edge information.

According to another advantageous feature of the present invention, the driver assistance system may be configured for displaying on a display an image computed from the processing result of the image processing device or complemented by an image of the vehicle surroundings. For example, a display of distances of objects is possible. Moreover, e.g. when a rearview camera is involved, the image can be processed so that edges can be emphasized or 3D models of the vehicle surroundings can be created.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
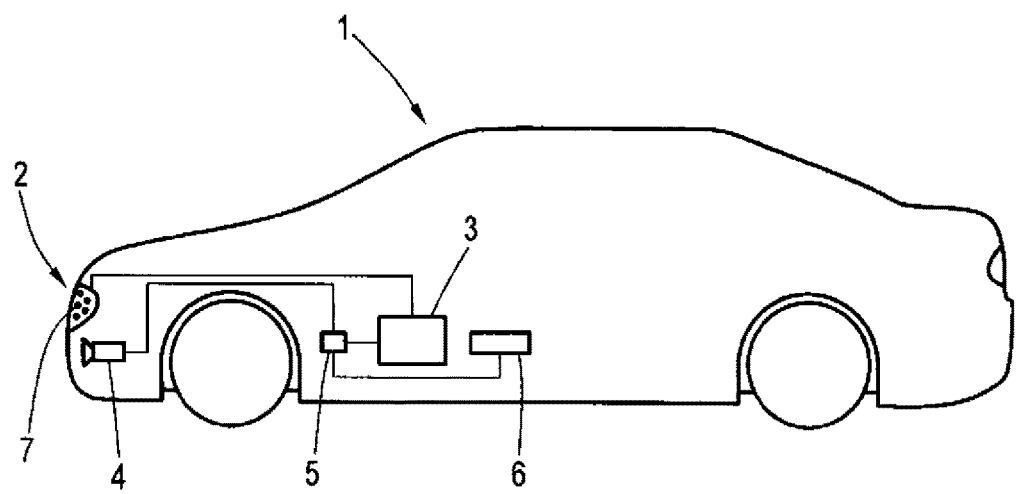
FIG. 1 is a basic illustration of a motor vehicle according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a basic illustration of a motor vehicle according to the present invention, generally designated by reference numeral 1. Mounted to the front region of the motor vehicle 1 is a lighting device 2 and a camera 4. Images captured by the camera 4 are sent to an image processing device 5. Processing results generated by the image processing device 5 are transmitted to a driver assistance system. The lighting device 2 includes a plurality of light sources 7, e.g. LEDs. The individual light sources 7 are operated by a control device 3. In order to capture images of the vehicle surroundings in at least two illuminations, the light sources 7 of the lighting device 2 are operated by the control device 3 immediately sequentially in at least two different modes which differently illuminate the vehicle surroundings. In addition, the control device 3 sends also a signal to the image processing device 5 to provide information about the illumination of the images. The image processing device 5 is then able on the basis of processing a predefined number of images to send a processing result to the driver assistance system 6. The driver assistance system 6 may use this processing result for autonomous piloting of the vehicle for example.

It is also possible for the image processing device 5 to instruct the control device 3 to produce further illumination situations in response to the result of the image processing so that further images can be processed. This is especially useful for example, when the distance of an object should be determined or there is still ambiguity about the authenticity of a detected edge.

Figure 2:
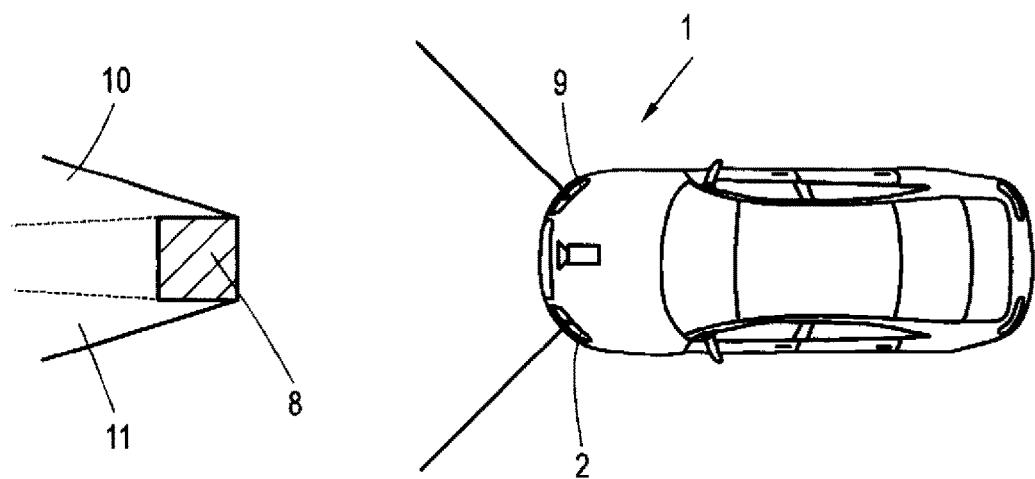
FIG. 2 is an exemplary embodiment of the present invention, depicting a recognition of shadows using two lighting devices.

FIG. 2 shows an exemplary embodiment for the recognition of shadows when two lighting devices are involved. Mounted to a front region of motor vehicle 1 is a camera 4 in midsection, a lighting device 2 to the left of the camera 4 and a lighting device 9 to the right of the camera 4. An obstacle 8 is shown at a distance to the front of the motor vehicle 2.

When both lighting devices 2, 9 are activated, zones are generated to the left and right of the obstacle 8 which are illuminated by only one lighting device, respectively, and involve shadow 10 produced by the lighting device 2 and shadow 11 produced by the lighting device 9. A rapid change in brightness occurs at the edges of these zones and in all likelihood is detected as edge. This needs to be avoided and is achieved by capturing in addition to the first image a further image which involves activation of only the lighting device 2 and still another image which involves activation of only the lighting device 9. As a result, the first of these images fully shows the shadow 10 of the lighting device 2 and generates a very contrast-rich edge, while the shadow 11 of the second lighting device 9 is not visible as the lighting device 9 is switched off. The other image shows precisely the reverse situation. Thus, edges caused by shadows are thus clearly more visible with high contrast in one image than before and not visible at all in the other image. As a consequence, such edges can thus be unambiguously recognized as the result of a shadow and thus can be disregarded for image processing.

Figure 3:
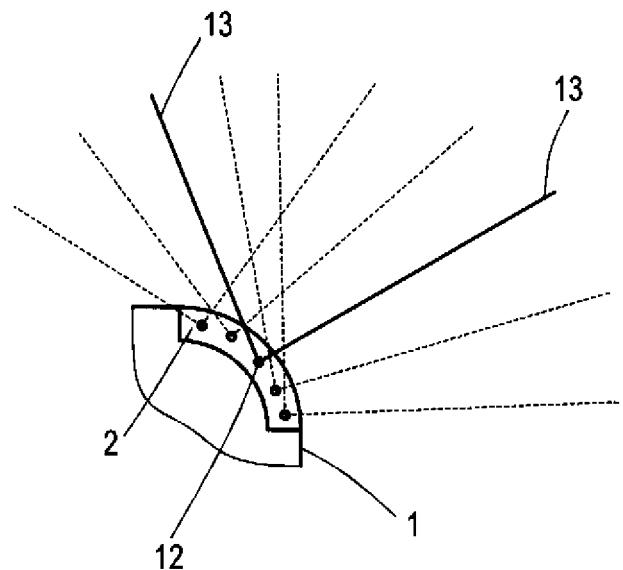
FIG. 3 is a schematic illustration of the present invention, depicting the presence of light cones using a lighting device with several light sources.

FIG. 3 shows a schematic illustration of a cursorily shown motor vehicle 1, depicting the presence of light cones using a lighting device 2 with several light sources which are arranged in offset relationship and illuminate a slightly rotated solid angle range. By way of example, the edge of the light cone 13 of the light source 12 is separately marked. As can be clearly seen, the light sources in their entirety illuminate a broad solid angle of the vehicle surroundings. This solid angle can be limited by deactivating individual light sources.

Figure 4:
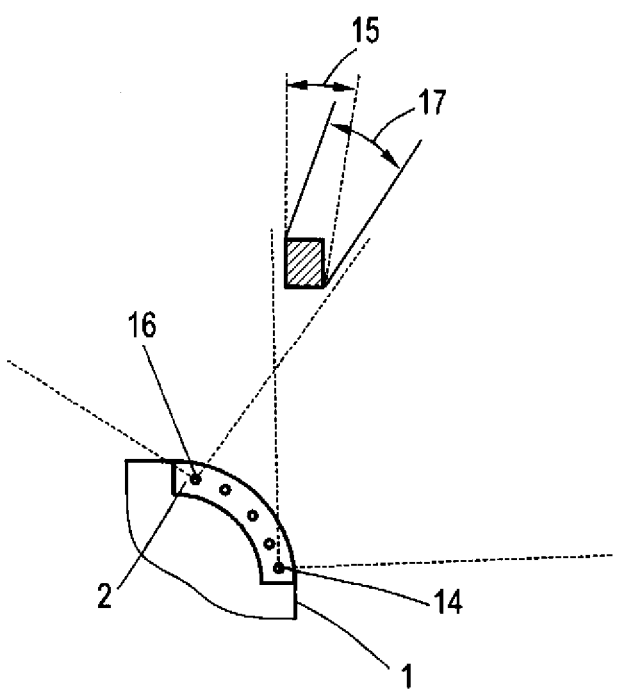
FIG. 4 is another exemplary embodiment of the present invention, depicting a recognition of shadows using a lighting device with several lighting sources.

FIG. 4 shows another exemplary embodiment of the present invention, depicting a recognition of shadows using a lighting device with several lighting sources. In this example, the obstacle 8 is exclusively illuminated by a lighting device 2. By way of example, the edges of the shadow 15 of the outer light source 14 and the shadow 17 of the inner light source 16 are shown. When activating the light sources successively from outwards inwardly, the edges of the shadow migrate between these positions. This results in a virtually continuous shift of the edge with a change of the light sources. Therefore, these edges can be easily recognized as caused by shadows and can be disregarded when determining the processing result of the image processing.

Figure 5:
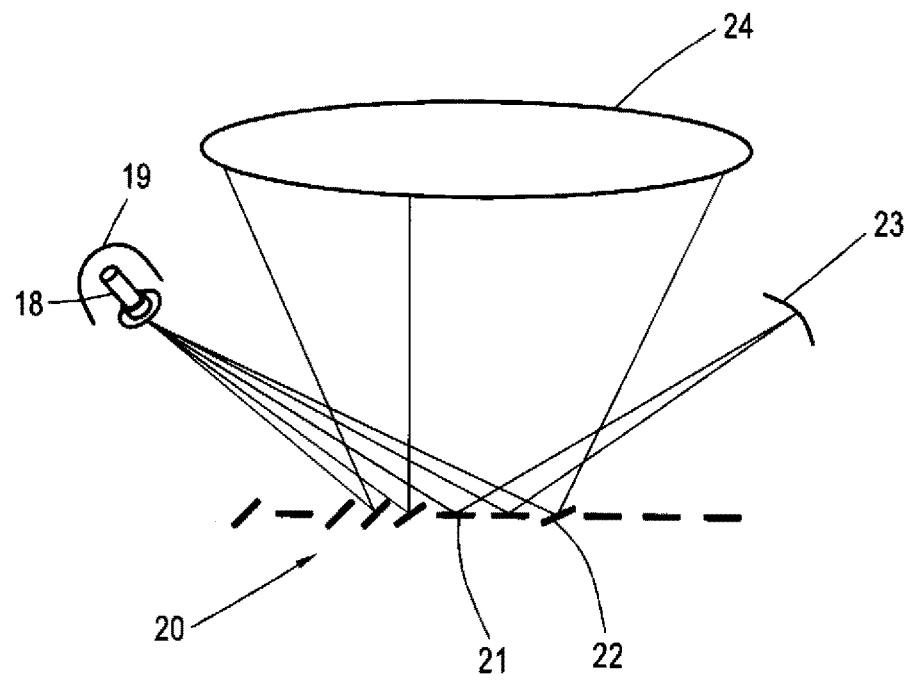
FIG. 5 is an exemplary embodiment of the present invention, depicting a lighting device with a micro-mirror actuator.

FIG. 5 shows an exemplary embodiment of the present invention, depicting a lighting device with a micro-mirror actuator. A light source 18 which is integrated in a reflector 19 hereby illuminates a micro-mirror actuator 20. The micro-mirror actuator 20 includes an array of micro-mirrors which can be switched back and forth between two states. A micro-mirror in initial or OFF state 21 reflects light in the direction of an absorber 23. A micro-mirror in ON state 22 reflects light in the direction of an optics 24 which projects the light cone. When all micro-mirrors assume the ON state, a light beam with maximum solid angle illumination is generated. By switching individual micro-mirrors or groups of micro-mirrors to the ON state, the light beam can be tailored such that portions of the light beam can be obscured. As a result, a selective illumination is realized.

Figure 6:
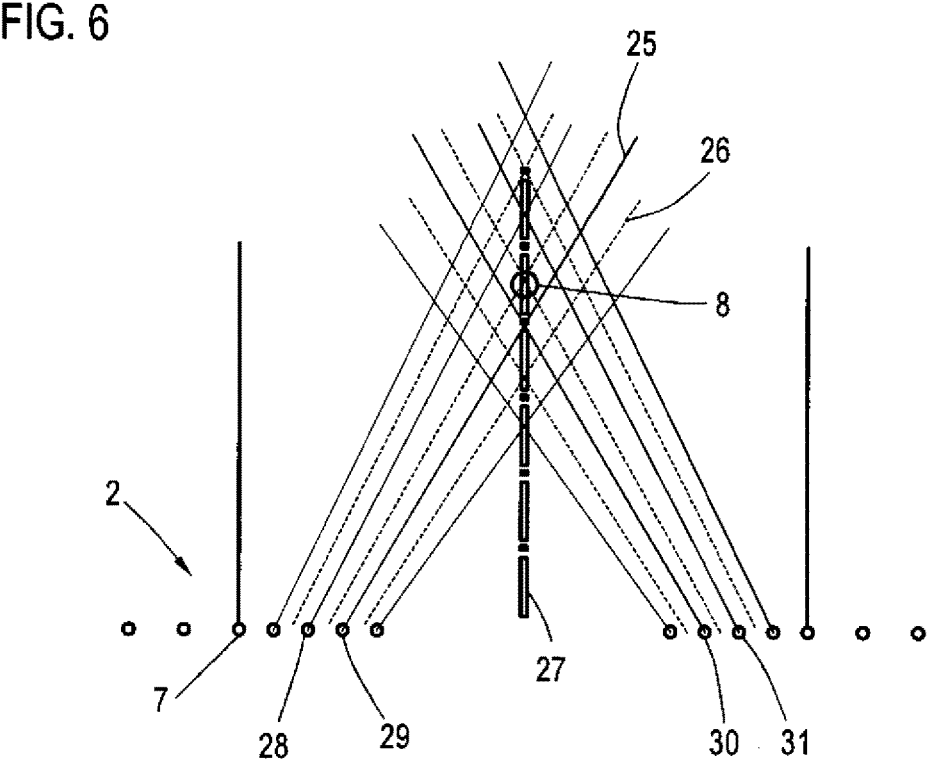
FIG. 6 is a schematic illustration of the present invention, depicting a distance recognition.

FIG. 6 is a schematic illustration of the present invention, depicting a distance recognition. For sake of simplicity, all light sources 7 of the lighting device 2 are arranged on a straight line. Continuous lines 25 indicate the center of the light cone of a light source, whereas broken lines 26 mark the transition zone between light cones of neighboring light sources. The dash-dot line 27 shows the solid angle which is associated to the camera pixel. For sake of clarity, a central pixel is selected to correspond with a straight line extending in travel direction.

When an obstacle 8 can be recognized on the camera pixel, the distance of the obstacle 8 can be determined. For that purpose, successive light sources of the left and right lighting devices can be deactivated, respectively, for example from outwards inwardly. When determining a significant decrease in the brightness of the pixel at any point in time, it is assumed that the object is located in the solid angle of the vehicle surroundings which this light source illuminates. It can thus be ascertained in the shown example that the object is in the area of the light sources 28, 29, 30, 31. As activation of any of these light sources causes a same change in brightness of the pixel, inference can be made that the object is located in the edge zone of the neighboring light cone of the light sources 28, 29 and 30, 31. As a result, two solid angles in relation to the lighting sources and a solid angle in relation to the camera are known for the positions of the object. This allows a redundancy in determination of the object position. As a result of the redundancy, errors in the distance measurement can easily be detected.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A motor vehicle, comprising:
   a control device;
   two lighting devices located at opposite sides of the motor vehicle and controllable by the control device sequentially in at least two modes which respectively illuminate surroundings of the vehicle differently so that first one of the lighting devices at one of the opposite sides of the motor vehicle is activated and thereafter another of the lighting devices at another of the opposite sides of the motor vehicle is activated to produce at least two images of the differently illuminated surroundings of the vehicle,
   wherein each of the lighting devices has several light sources which are arranged in an offset relationship and illuminate a rotated solid angle range;
   at least one camera for capturing the at least two images of the differently illuminated surroundings of the vehicle;
   an image processing device configured for processing the at least two different images for producing a processing result, wherein the processing result is a distance interval for an object at at least one pixel, said control device having at least one further modus to differently illuminate the surroundings of the vehicle for operating at least one of the lighting devices, said image processing device configured to process at least one further different image, when the distance interval has a width which exceeds a desired value; and
   a driver assistance system controlled in response to the processing result, wherein the driver assistance system is configured for autonomous execution of entering a garage or parking.

2. The motor vehicle of claim 1, wherein the lighting devices include at least one light source capable of being modulated.

3. The motor vehicle of claim 1, wherein the lighting devices include a plurality of light sources, said control device being configured for switching or modulation of the light sources individually or in groups.

4. The motor vehicle of claim 1, wherein the lighting devices include at least one micro-mirror actuator.

5. The motor vehicle of claim 1, wherein the driver assistance system is configured for autonomous execution of individual driving maneuvers.

6. The motor vehicle of claim 1, wherein the driver assistance system is configured for displaying on a display an image computed from the processing result of the image processing device or complemented by an image of the vehicle surroundings.

7. A method of operating a driver assistance system of a motor vehicle, comprising:
   capturing a first image by a camera of a first area of a vehicle surroundings illuminated by a first lighting device at one of two opposite sides of the motor vehicle when operating in a first mode;
   capturing a second image by the camera of a second area of the vehicle surroundings illuminated by a second lighting device at another of the two opposite sides of the motor vehicle when operating in a second mode,
   wherein each of the lighting devices has several light sources which are arranged in an offset relationship and illuminate a rotated solid angle range;
   processing the first and second images by an image processing device to produce a processing result, wherein the processing step includes determining a distance interval for an object at at least one pixel, and capturing a third image by the camera of a third area of the vehicle surroundings illuminated by at least one of the lighting devices when operating in a third mode and processing the third image by the image processing device, when a width of the distance interval exceeds a desired value;
   transmitting the processing result to the driver assistance system; and
   autonomously executing a driving maneuver by the driver assistance system in response to the transmitted processing result, wherein the driving maneuver involves entering a garage or parking.

8. The method of claim 7, wherein the driver assistance system operates in either of two ways, a first way in which the driver assistance system computes an image of the vehicle surroundings in response to the transmitted processing result and subsequently displays the computed image on a display, a second way in which the driver assistance system supplements the processing result with at least one of the first and second images and subsequently displays the supplemented image on a display.

9. The motor vehicle of claim 1, wherein all of the light sources of each of the lighting devices illuminate the solid angle range which is a broad angle range of the vehicle surroundings, and some of the light sources of each of the lighting devices are deactivatable to limit the angle range.

10. The method of claim 7, wherein all of the light sources of each of the lighting devices illuminate the solid angle range which is a broad angle range of the vehicle surroundings, and some of the light sources of each of the lighting devices are deactivatable to limit the angle range.

* * * * *